United States Patent
Knapik et al.

(10) Patent No.: US 7,729,273 B2
(45) Date of Patent: *Jun. 1, 2010

(54) METHOD AND APPARATUS FOR CONSERVING BANDWIDTH BETWEEN A NETWORK DEVICE AND A REMOTE DEVICE

(75) Inventors: Matt D. Knapik, Telford, PA (US); Thomas J. Doblmaier, North Wales, PA (US); Stefan A. Seniuk, Willow Grove, PA (US)

(73) Assignee: General Instrument Corporation, Horsham, PA (US)

( * ) Notice: Subject to any disclaimer, the term of this patent is extended or adjusted under 35 U.S.C. 154(b) by 903 days.

This patent is subject to a terminal disclaimer.

(21) Appl. No.: 11/471,242

(22) Filed: Jun. 20, 2006

(65) Prior Publication Data

US 2007/0291658 A1   Dec. 20, 2007

(51) Int. Cl.
 *H04L 12/26* (2006.01)
(52) U.S. Cl. ............... 370/252; 370/395.2; 370/395.4; 370/401; 709/218; 709/228
(58) Field of Classification Search ......... 370/250–253, 370/229, 235, 217–220, 221, 222, 241, 241.1, 370/242–246, 389, 395.2, 395.4, 400, 401; 709/227–229, 217–219
See application file for complete search history.

(56) References Cited

U.S. PATENT DOCUMENTS

| | | | |
|---|---|---|---|
| 7,460,556 B2 | 12/2008 | Duggirala et al. | |
| 7,483,437 B1 * | 1/2009 | Mohaban | 370/400 |
| 2006/0182141 A1 | 8/2006 | Duggirala et al. | |
| 2007/0233855 A1 | 10/2007 | Brown et al. | |
| 2008/0045277 A1 | 2/2008 | Plestid et al. | |
| 2008/0154913 A1 | 6/2008 | Kohonen | |
| 2008/0159163 A1 | 7/2008 | Valli | |
| 2008/0205288 A1 | 8/2008 | Herzog | |

* cited by examiner

*Primary Examiner*—Aung S Moe
*Assistant Examiner*—Habte Mered
(74) *Attorney, Agent, or Firm*—Stewart M. Wiener

(57) ABSTRACT

A method and an apparatus are provided for improving or optimizing the frequency at which the keep-alive messages are exchanged between a network device (e.g., network server) and a remote device (e.g., a PC) behind a router or gateway. By improving or optimizing the frequency at which these messages are exchanged, the amount of network bandwidth that is consumed as a result of the exchange of keep-alive messages can be reduced. This allows a network device to remotely access a remote device in a very efficient manner in terms of the number of keep-alive messages that are generated and processed and in terms of bandwidth consumption.

21 Claims, 4 Drawing Sheets

METHOD AND APPARATUS FOR CONSERVING BANDWIDTH BETWEEN A NETWORK DEVICE AND A REMOTE DEVICE

TECHNICAL FIELD OF THE INVENTION

The invention relates to communications networks and networked devices. More particularly, the invention relates to a way to allow a network device to remotely access a remote device over a network.

BACKGROUND OF THE INVENTION

In a communications network, such as the Internet, for example, there is often a need for a network device, such as a server, to be able to remotely access a remote device on the network, such as a personal computer (PC) located in a person's home. Typically, a PC in the home resides behind a router that implements a configuration known as Network Address Translation (NAT). The NAT inherently prevents a remote server from accessing the PC unless a NAT mapping is established in the router that allows the server to access the PC.

The NAT mapping can be established by a user by manually configuring the NAT port address translation table or by manually configuring the router to place the PC or other device in the "demilitarized zone" (DMZ) of the router. However, the techniques that must be used to configure the router vary among different types of routers and are beyond the capabilities of many users.

When a NAT mapping is established to provide access to the device behind the router, the device has to periodically send "keep-alive" messages to the server to maintain the NAT mapping, i.e., to keep the mapping alive. The server responds to these messages. During the message exchange, the router will maintain a NAT port address translation entry in the NAT mapping that allows the server to access the device through the router. The exchanges must be sent frequently enough to keep the NAT entry alive. If the exchanges are not sent frequently enough, the NAT port address translation entry timer will timeout, and the server will not be able to access the device. This problem is compounded by the fact that different routers may have different timeout values for NAT port address translation entries.

The Universal Plug and Play (UPnP) protocol provides a technique by which a software application program can configure a router on behalf of a user. However, many routers do not support UPnP or do not have UPnP enabled by default.

A need exists for a way to allow a network device, such as a server, to remotely access a remote device behind a router or gateway, such as a PC, without requiring the consumption or a large amount of network bandwidth.

SUMMARY OF THE INVENTION

The invention provides a method and an apparatus that are employed in a remote device for enabling a network device to remotely access the remote device over a network. The apparatus comprises an input/output (I/O) port in communication with a router or gateway device, and a processor in communication with the I/O port. The processor is configured to perform a Test Time Period algorithm that determines how frequently or infrequently keep-alive messages should or must be sent between the remote device and the network device. By determining how frequently or infrequently keep-alive messages should or must be sent, the frequency of sending the messages can be controlled such that the amount of bandwidth that is consumed as a result of sending the messages is consumed in an efficient manner.

The method comprises sending one or more Test Time Period Request Messages from a remote device to a network device, determining whether one or more Test Time Period Response Messages are received by the remote device from the network device, and, based on the determination, determining how frequently or infrequently keep-alive messages should or must be sent between the remote device and the network device.

In accordance with an embodiment, the method is performed by a computer software program embodied on a computer-readable medium for enabling a network device to remotely access a remote device over a network. The program comprises instructions for sending one or more Test Time Period Request Messages from a remote device to a network device, instructions for determining whether one or more Test Time Period Response Messages are received by the remote device from the network device, and instructions for determining, based on the determination made as to whether one or more Test Time Period Response Messages have been received by the remote device from the network device, how frequently or infrequently keep-alive messages should or must be sent between the remote device and the network device.

These and other features and advantages of the invention will become apparent from the following description, drawings and claims.

DETAILED DESCRIPTION OF AN EMBODIMENT

The invention provides method and an apparatus for improving or optimizing the frequency at which the "keep-alive" messages are exchanged between a network device (e.g., network server) and a remote device (e.g., a PC) behind a router or gateway. By improving or optimizing the frequency at which these messages are exchanged, the amount of network bandwidth that is consumed as a result of the exchange of keep-alive messages can be reduced. This allows a network device to remotely access a remote device in a very efficient manner in terms of the number of keep-alive messages that are generated and processed and in terms of bandwidth consumption.

The invention is described herein with reference to NAT messages and devices that are in communications over the Internet using the Transmission Control Protocol/Internet Protocol (TCP/IP). However, the invention applies equally to other types of messages, networks and protocols. The term "keep-alive message", as that term is used herein, is intended to denote any type of message that is sent from a remote device to a network device for the purpose of allowing the network device to gain and/or maintain access to the remote device through a router, gateway, or similar device.

Figure 1:
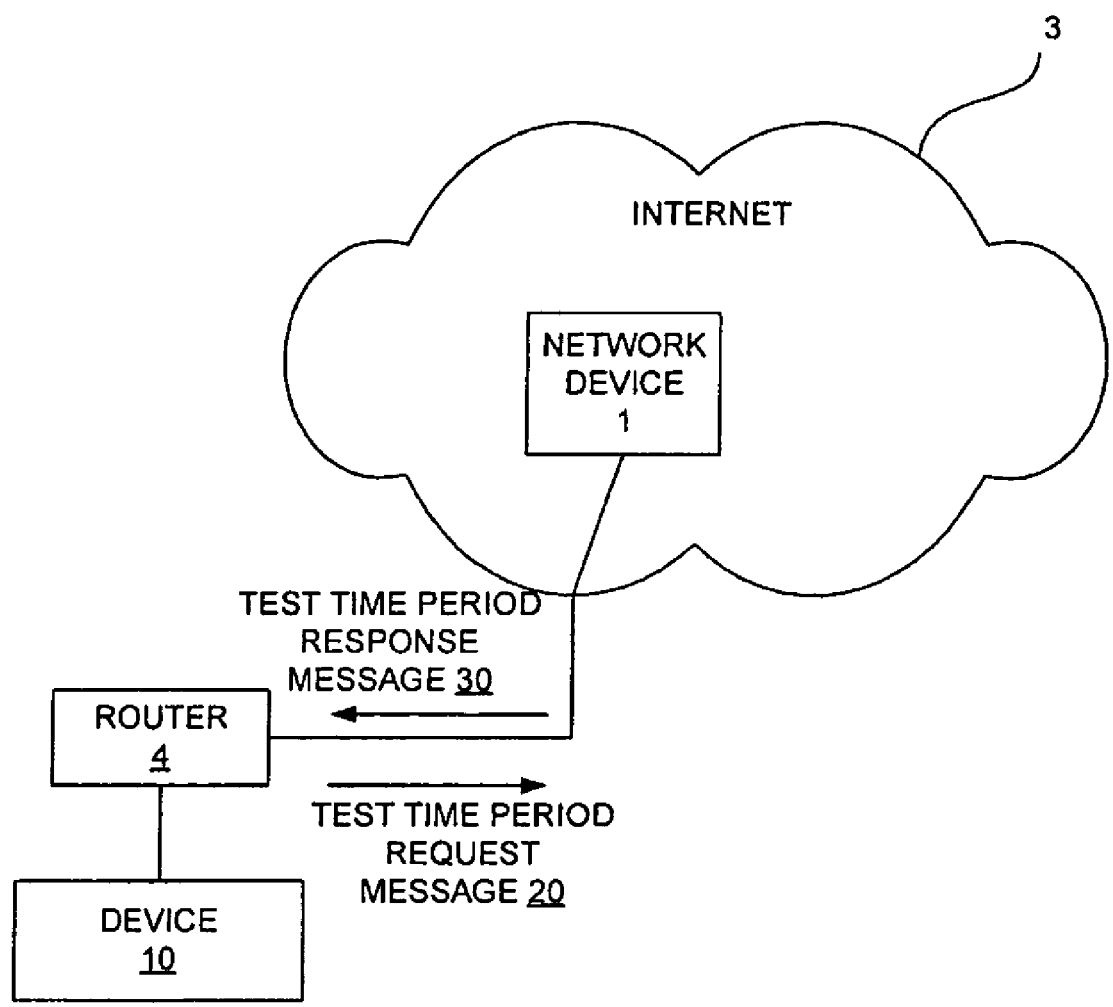
FIG. 1 illustrates a network diagram that demonstrates an example of the manner in which the invention enables a remote device to be remotely accessed by a network device.

FIG. 1 illustrates a network diagram that demonstrates an example of the use of the invention to allow a network device 1, such as a network server, for example, to remotely access a remote device 10, such as a PC, for example, that is connected to the network 3 by a router 4. The remote device 10 may be located at a user's home, at a workplace with in a local area network (LAN), a wide area network (WAN), or at any other location as a stand-alone device or as part of some network. The device 10 sends a Test Time Period Request Message 20 via a router or gateway 4 over network 3 to the network device 1. This message indicates a time period that is to be tested. The network device 1 receives the Test Time Period Request Message 20 and sets a timer to expire at the end of the test period. When the time period expires, the network device 1 sends a Test Time Period Response Message 30 to the device 10. Multiple Time Period Request and Time Period Response Messages 10 and 30 are typically communicated between the network device 1 and the remote device 10 until the device 10 has determined how frequently these messages need to be sent to keep the aforementioned NAT port address translation entry alive in the router 4. As described below in detail with reference to FIGS. 3 and 4, the remote device 10 makes this determination by determining whether or not the time period indicated in the Message 20 was longer than the NAT port address translation entry timeout period of the router 4. The time period is then adjusted, if necessary, based on this determination.

Preferably, the devices 1 and 10 use the exchange of the messages 20 and 30 to allow the device 10 to determine the maximum allowable time period for sending NAT keep-alive messages in order to keep the NAT port address translation entry alive in the router 4. Then, the NAT keep-alive messages are exchanged between the remote device 10 to the network device 1 with a periodicity that is based on this maximum allowable time period. Preferably, the time period that starts when a keep-alive message is sent by the remote device 10 and ends when the remote device receives a response to the keep-alive message is equal to the maximum allowable time period determined in accordance with the invention. Thus, the keep-alive messages preferably are sent as infrequently as possible in order to maximize efficiency and minimize the amount of bandwidth that is consumed as a result of transmitting these messages. However, it is not required that the maximum allowable time period be used. Some other time period that is less than the maximum allowable time period may be used if desired. The primary goal is to determine how frequently the messages must be sent in order to keep the entry alive, and then use a time period that results in an efficient use of bandwidth.

Figure 2:
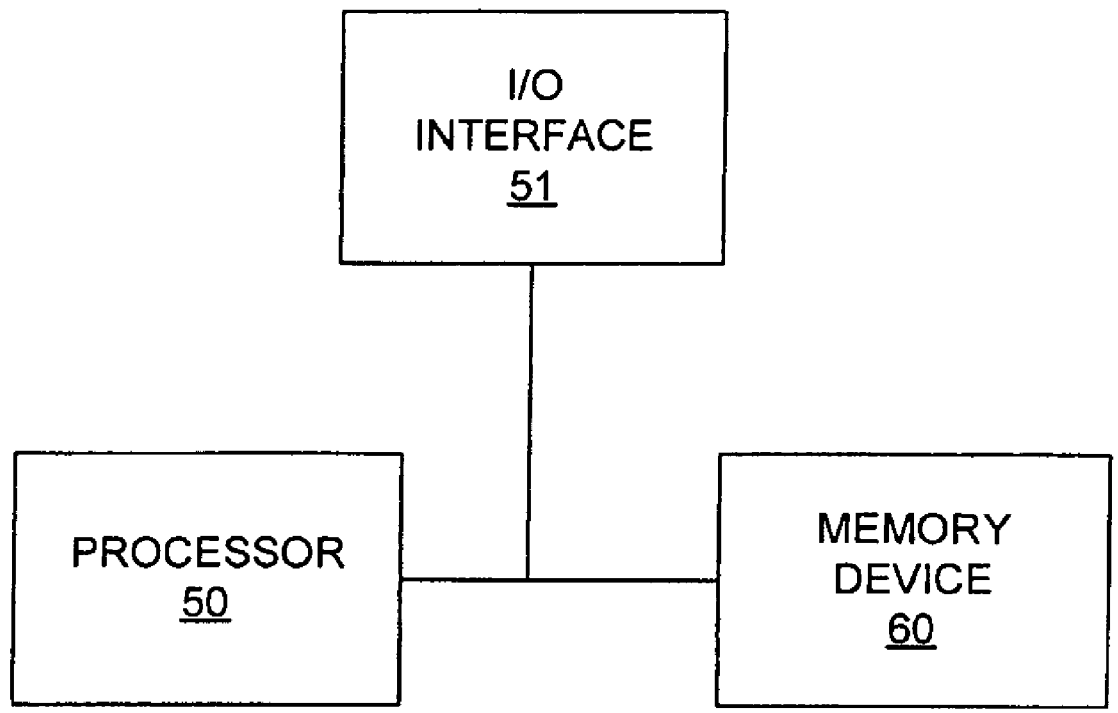
FIG. 2 illustrates a block diagram of the remote device illustrated in FIG. 1.

FIG. 2 illustrates a block diagram of the apparatus of the invention, which is implemented in the device 10 shown in FIG. 2. The apparatus includes a processor 50, an input/output (I/O) interface 51 and a memory device 60. The processor 50 performs the algorithm of the invention for determining the frequency at which the keep-alive messages should or must be sent. The processor 50 is typically a microprocessor that performs the algorithm by executing a software computer program. However, the processor 50 may be any type of computational device, including, for example, a microprocessor, a microcontroller, a programmable gate array, a programmable logic array, an application specific integrated circuit (ASIC), a system on a chip (SOC), etc. The software program may be stored in memory device 60, which may be any type of computer-readable medium, including, for example, random access memory (RAM), dynamic RAM (DRAM), flash memory, read only memory (ROM) compact disk ROM (CD-ROM), digital video disks (DVDs), magnetic disks, magnetic tapes, etc. The invention also encompasses electrical signals modulated on wired and wireless carriers (e.g., electrical conductors, wireless carrier waves, etc.) in packets and in non-packet formats.

The processor 50 sends and receives messages via the I/O interface 51. The frequency at which the messages are generated and sent by the processor 50 is based on the determinations made by the processor performing the algorithm of the invention. Once the processor 50 has performed the algorithm to determine the time period to be used when sending the keep-alive messages, the processor 50 uses this time period to set a timer that controls the timing of sending the keep-alive messages. The I/O interface 51 interfaces with a router or gateway, as described above with reference to FIG. 1. The keep-alive messages that are generated and sent by the processor include a time period indication that informs the network device as to how long it should wait before responding to the message.

Figure 3:
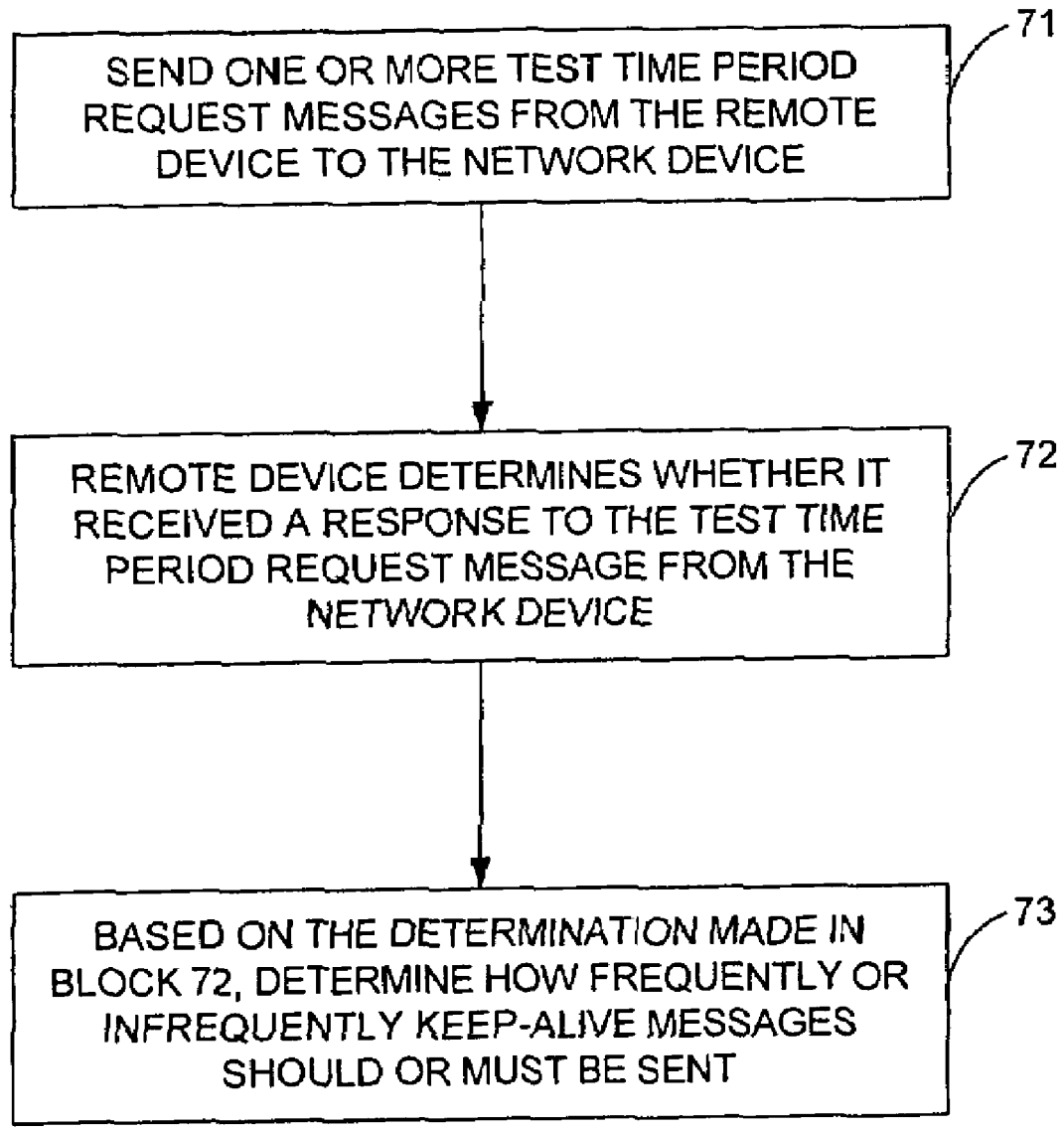
FIG. 3 illustrates a flowchart that demonstrates the method of the invention performed by the remote device shown in FIG. 1 in accordance with an embodiment.

FIG. 3 illustrates a flowchart that demonstrates the method of the invention in accordance with an exemplary embodiment. The remote device sends one or more Test Time Period Request Messages to the network device, as indicated by block 71. The remote device determines whether it received a Test Time Period Response Message in response to the Test Time Period Request Message, as indicated by block 72. Based on the determination represented by block 72, the remote device determines how frequently it should or must send keep-alive messages to the network device without the NAT port address translation entry timeout period of the router or gateway expiring, as indicated by block 73.

In accordance with the preferred embodiment, the processor 50 operates in an optimizing state during which it determines the optimum periodicity for sending keep-alive messages, and in an optimized state during which the processor 50 utilizes the optimum periodicity value for sending keep-alive messages. In the optimizing state, the processor 50 sends keep-alive messages at a less-than-optimal periodicity to the network device 1 via a primary communications port of the remote device 10. During this state, the processor 50 sends the Test Time Period Request Message 20 to the network device 1 and receives the Test Time Period Response Message 30 from the network device 1 via a secondary communications port of the remote device 10. Once the optimum periodicity has been determined, the processor 50 switches to the optimized state and uses the optimum periodicity on the primary communications port to send keep-alive messages to the network device 1.

Opening a port in a router may create a potential security risk. In order to reduce or eliminate this risk, a port-hopping algorithm can be performed such that the port that is being used in the optimized state changes periodically. The port hopping sequence can be a fixed sequence or a random or pseudorandom sequence, provided the sequence is known or can be ascertained by both the remote device and the network device. Each time the port changes, the previous port is closed and the new port is opened. Changing ports in this manner makes it virtually impossible for an unauthorized device to remotely access the remote device via the router.

Figure 4:
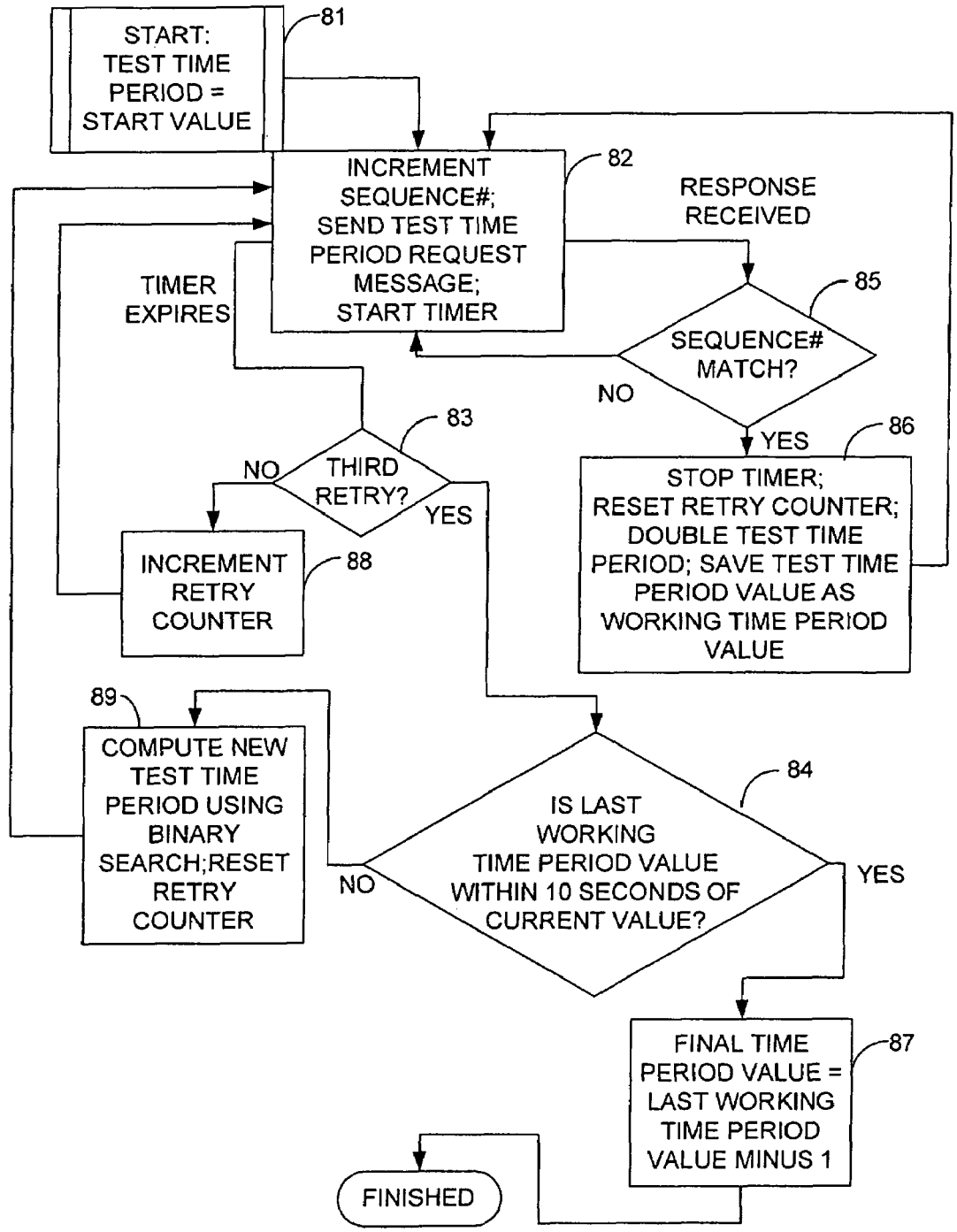
FIG. 4 illustrates a flowchart that demonstrates the method of the invention performed by the remote device shown in FIG. 1 in accordance with a particular exemplary embodiment.

FIG. 4 illustrates a flowchart that demonstrates the algorithm of the invention in accordance with a particular exemplary embodiment. At the start of the algorithm, a Time Period parameter is set to a starting value, as indicated by block 81. The process then proceeds to block 82. A Sequence# parameter is set to some initial value and is thereafter incremented during the process. Sequence numbers are used for the NAT messages to allow the processor 50 to associate messages sent by the remote device 10 with messages received by the remote device 10. Therefore, each time the remote device 10 sends a Test Time Period Request Message, the message includes a new sequence number. The message also includes the Time Period value. When the Test Time Period Request Message is sent by the remote device 10 to the network device 1, a timer is started, as indicated by block 82.

If the timer expires before a Test Time Period Response Message is received by the remote device from the network device 1, the process proceeds to decision block 83. At block 83, a determination is made as to whether the message was sent three times without receiving a response. As stated above, when a response is received by the remote device 10, it is safe to assume that Test Time Period was shorter than the NAT translation timeout period of the router. When a response is not received, this means that the NAT translation timeout period of the router 4 is shorter than the Test Time Period, or that the response was lost due to some other network issue. In order to make that determination, the process is retried multiple times (e.g., 3 times). If the response still is not received after being retried multiple times, the Test Time Period value needs to be set to a lower value.

In the exemplary embodiment represented by FIG. 4, when a message has been retried three times and no response has been received, as determined at block 83, the process proceeds to block 84. When a message has not been retried three times, then a Retry counter is incremented, as indicated by block 88, and the process returns to block 82. The Test Time Period Request Message is sent again, and the timer is started. If no response is received before the timer times out, the process again proceeds to block 83, and a determination is made as to whether the message has been retried for the third time, i.e., whether the Retry counter has been incremented to 3. If so, the process proceeds to block 84.

If a response is received before the timer times out, then the process proceeds to block 85. At block 85, a determination is made as to whether the sequence number of the received Test Time Period Response Message matches the sequence number of the Time Period Request Message that was sent. If not, the process returns to block 82. If so, the process proceeds to block 86. At block 86, the timer is stopped, the Retry counter is reset, the Test Time Period value is doubled, and the new Test Time Period value is saved as the current Working Time Period value. It should be noted that the Test Time Period value does not have to be doubled. This is merely an example of one way of increasing the Test Time Period value to make it closer to the NAT timeout value in order to reduce the number of keep-alive messages that are sent. The process then returns to block 82, and the next Test Time Period Request Message is sent and the timer is started.

If the timer reaches the new Working Time Period value before a response is received, the process again proceeds to block 83. If a determination is made that the Retry counter value is equal to 3 (a response was not received after 3 tries), the process proceeds to block 84. At block 84, a determination is made as to whether the last Working Time Period value is within 10 seconds of the current Working Time Period value. The purpose of this decision is to determine if the time frame of successful packet exchange needs to change to a more granular time frame. If a determination is made at block 84 that the last Working Time Period value is within 10 seconds of the current Working Time Period value, then a Final Time Period value is set equal to the last Working Time Period−1, as indicated by block 87. The Final Time Period value is then used to control the frequency of sending keep-alive messages from the remote device 10 to the network device 1. The Final Time Period value may be, but need not necessarily be, an optimum time period value. If the Final Time Period value is an optimum time period value, this means that any increase in the Final Time Period value will result in keep-alive messages being sent too infrequently, thereby allowing the NAT entry that keeps the router port open to die and the port to close. The term "Final Time Period" value, as that term is used herein, can be any value that is large enough to prevent keep-alive messages from being sent more frequently than is desired or necessary, and that is small enough to keep the NAT entry alive and the port open.

The Working Time Period is the longest time period that the port on the router remains open before the NAT timeout period expires causing the router to close the port. Subtracting 1 from the Working Time Period ensures that the traffic will continue circulating, thereby forcing the port to remain open continuously. It is not necessary for this particular value or any value to be subtracted from the Working Time Period value. This value is used only for exemplary purposes.

If a determination is made at block 84 that the last Working Time Period value is not within 10 seconds of the current Working Time Period value, the process proceeds to block 89. At block 89, a new Test Time Period value is computed using a binary search algorithm, and the Retry counter is reset. The binary search algorithm searches for time slots that are increasingly closer to the NAT timeout period value. The purpose of this is to fine-tune the Test Time Period value without going over the NAT timeout period value. The process then returns to block 82.

It should be noted that the method described above with reference to FIG. 4 is an example that uses particular parameters and numeric values in a particular algorithm. The invention, of course, is not limited to this particular example. Also, the invention is not limited to being performed using the particular functions represented by the blocks. The algorithm for determining the frequency at which keep-alive messages should be sent can be performed in a variety of ways. Also, although the algorithm has been described as being performed in software, the algorithm may be performed in software, hardware, or a combination of software and hardware or firmware.

The invention has been described with respect to exemplary embodiments for the purpose of demonstrating the principles and concepts of the invention. Those skilled in the art will understand, in view of the description provided herein, the manner in which modifications can be made to these embodiments and that all such modifications are within the scope of the invention.

What is claimed is:

1. An apparatus employed in a remote device for enabling a network device to remotely access the remote device over a network, the apparatus comprising:

an input/output (I/O) port in communication with a router or gateway device that connects the remote device to the network, the remote device being in communication with the network device via the router or gateway device; and a processor in communication with the I/O port, the processor being configured to determine a frequency of sending keep-alive messages between the remote device and the network device, the determination comprising sending a plurality of Test Time Period Request Messages having a Test Time Period value from the remote device to the network device, wherein the Test Time Period value of each of the plurality of Test Time Period Request Messages is the same and the Test Time Period value indicates to the network device the amount of time that the network device is to wait before responding to the Test Time Period Request Message, and wherein the determination is based upon whether one or more Test Time Period Response Messages are received within the Test Time Period value by the remote device from the network device.

2. The apparatus of claim 1, wherein the processor determines whether or not to adjust the Test Time Period value based at least on whether the processor receives via the I/O port the Test Time Period Response Message from the network device in response to the Test Time Period Request Message.

3. The apparatus of claim 2, wherein if the processor determines that the Test Time Period value is to be adjusted, the processor determines by how much the Test Time Period value is to be adjusted and adjusts the Test Time Period value by the determined amount to obtain an adjusted Test Time Period value.

4. The apparatus of claim 2, wherein if the processor determines that the Test Time Period value is not to be adjusted, the processor uses the Test Time Period value as a Final Time Period value to control how frequently or infrequently keep-alive messages are sent between the remote device and the network device.

5. The apparatus of claim 3, wherein if the processor adjusts the Test Time Period value to obtain said adjusted Test Time Period value, the processor causes another Test Time Period Request Message to be sent via the I/O port through the router or gateway device to the network device that includes said adjusted Test Time Period value that indicates to the network device an adjusted Test Time Period that the network device is to wait before responding to the another Test Time Period Request Message, wherein the processor determines whether or not to adjust said adjusted Test Time Period value based on whether the processor receives via the I/O port a Test Time Period Response Message from the network device in response to said another Test Time Period Request Message.

6. The apparatus of claim 5, wherein if the processor determines that said adjusted Test Time Period value is to be adjusted, the processor determines by how much said adjusted Test Time Period value is to be adjusted and adjusts the adjusted Test Time Period value by the determined amount.

7. The apparatus of claim 6, wherein if the processor determines that said adjusted Test Time Period value is to be adjusted, the processor causes one or more additional Test Time Period Request Messages to be sent via the I/O port through the router or gateway device to the network device, and wherein the processor causes said adjusted Test Time Period value to continue to be further adjusted until the processor decides that a current Test Time Period value should not be further adjusted and should be used as a Final Time Period value, wherein the Final Time Period value is used by the network device to control the frequency of keep-alive messages that are sent between the remote device and the network device.

8. The apparatus of claim 7, wherein the Final Time Period is an Optimum Time Period that is used by the remote device to ensure that the frequency of keep-alive messages sent between the remote device and the network device is only frequently enough to ensure that one or more ports in the router or gateway device remain open to allow the network device to access the remote device.

9. The apparatus of claim 7, wherein the Final Time Period is used by the remote device to ensure that the frequency of keep-alive messages that are sent between the remote device and the network device is frequently enough to ensure that one or more ports in the router or gateway device remain open to allow the network device to access the remote device and infrequently enough to limit an amount of network bandwidth consumed by sending the keep-alive messages between the remote device and the network device.

10. The apparatus of claim 1, wherein the router or gateway device uses a Network Address Translation (NAT) configuration, and wherein the keep-alive messages are NAT keep-alive messages that are sent between the remote device and the network device to keep a NAT port address translation entry alive in the router or gateway device to ensure that the network device is allowed to access the remote device.

11. A method employed in a remote device for enabling a network device to remotely access the remote device over a network, the method performed by a processor of the remote device, comprising:
sending a plurality of Test Time Period Request Messages having a time period value from a remote device to a network device, the remote device being in communication with the network device via a router or gateway device that connects the remote device to the network, wherein the time period value of each of the plurality of Test Time Period Request Messages is the same and the time period value indicates to the network device the amount of time that the network device is to wait before responding to the Test Time Period Request Message;
determining whether said one or more Test Time Period Response Messages are received within the time period value by the remote device from the network device; and
based on the determination of whether one or more Test Time Period Response Messages have been received by the remote device from the network device, determining frequency of sending keep-alive messages between the remote device and the network device.

12. The method of claim 11, wherein the method further comprises determining whether or not to adjust the Test Time Period value based on whether the processor receives via the I/O port the Test Time Period Response Message from the network device in response to the Test Time Period Request Message.

13. The method of claim 12, wherein if the processor determines that the Test Time Period value is to be adjusted, the processor determines by how much the Test Time Period value is to be adjusted and adjusts the Test Time Period value by the determined amount to obtain an adjusted Test Time Period value.

14. The method of claim 12, wherein if the processor determines that the Test Time Period value is not to be adjusted, the processor uses the Test Time Period value as a Final Time Period value to control the frequency of sending keep-alive messages that are sent between the remote device and the network device.

15. The method of claim 13, wherein if the processor adjusts the Test Time Period value to obtain said adjusted Test Time Period value, the processor causes another Test Time Period Request Message to be sent via the I/O port through the router or gateway device to the network device that includes said adjusted Test Time Period value that indicates to the network device an adjusted Test Time Period that the network device is to wait before responding to the another Test Time Period Request Message, wherein the processor determines whether or not to adjust said adjusted Test Time Period value based on whether the processor receives via the I/O port a Test Time Period Response Message from the network device in response to said another Test Time Period Request Message.

16. The method of claim 15, wherein if the processor determines that said adjusted Test Time Period value is to be adjusted, the processor determines by how much said adjusted Test Time Period value is to be adjusted and adjusts the adjusted Test Time Period value by the determined amount.

17. The method of claim 15, wherein if the processor determines that said adjusted Test Time Period value is to be adjusted, the processor causes one or more additional Test Time Period Request Messages to be sent via the I/O port through the router or gateway device to the network device, and wherein the processor causes said adjusted Test Time Period value to continue to be further adjusted until the processor decides that a current Test Time Period value should not be further adjusted and should be used as a Final Time Period value, wherein the Final Time Period value is used by the network device to control the frequency of sending keep-alive messages between the remote device and the network device.

18. The method of claim 17, wherein the Final Time Period is an Optimum Time Period that is used by the remote device to ensure that the frequency of keep-alive messages sent between the remote device and the network device is only frequently enough to ensure that one or more ports in the router or gateway device remain open to allow the network device to access the remote device.

19. The method of claim 17, wherein the Final Time Period is used by the remote device to ensure that the frequency of keep-alive messages that are sent between the remote device and the network device is frequent enough to ensure that one or more ports in the router or gateway device remain open to allow the network device to access the remote device and infrequent enough to limit an amount of network bandwidth consumed by sending the keep-alive messages between the remote device and the network device.

20. The method of claim 11, wherein the router or gateway device uses a Network Address Translation (NAT) configuration, and wherein the keep-alive messages are NAT keep-alive messages that are sent between the remote device and the network device to keep a NAT port address translation entry alive in the router or gateway device to ensure that the network device is allowed to access the remote device.

21. A computer-readable non-transitory storage medium for enabling a network device to remotely access a remote device over a network, the computer-readable non-transitory storage medium comprising stored instructions for execution by a processor of the remote device, the stored instructions comprising:
   instructions for sending a plurality of Test Time Period Request Messages having a Time Period value from a remote device to a network device, the remote device being in communication with the network device via a router or gateway device that connects the remote device to the network, wherein the Time Period value of each of the plurality of Test Time Period Request Messages is the same and the time period value indicates to the network device the amount of time that the network device is to wait before responding to the Test Time Period Request Message; and
   instructions for determining whether one or more Test Time Period Response Messages are received within the time period value by the remote device from the network device; and
   instructions for determining, based on the determination made as to whether said one or more more Test Time Period Response Messages have been received by the remote device from the network device, a frequency of sending keep-alive messages between the remote device and the network device.

* * * * *